March 1, 1927.  
E. A. GRAHAM  
TELEPHONIC RECEIVER  
Filed July 21, 1925

1,619,114

INVENTOR  
Edward Alfred Graham  
BY Dowell & Dowell  
his ATTORNEYS

March 1, 1927. E. A. GRAHAM 1,619,114
TELEPHONIC RECEIVER
Filed July 21, 1925 2 Sheets-Sheet 2
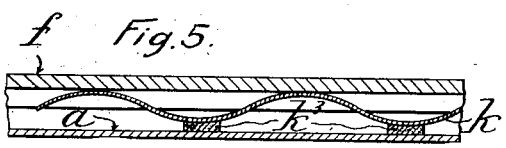
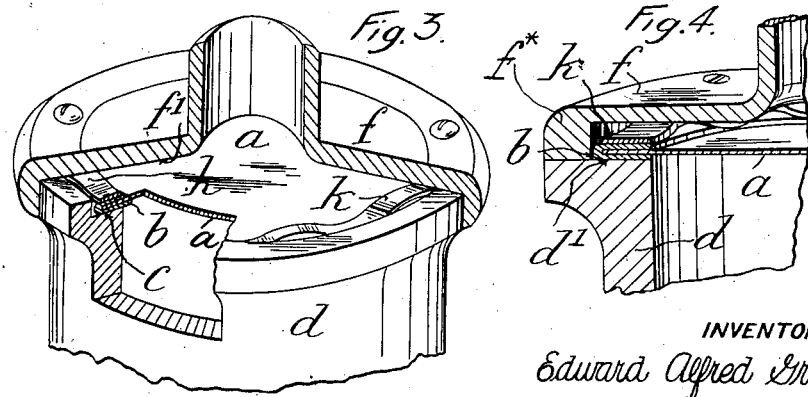
INVENTOR
Edward Alfred Graham
BY Dowell and Dowell
his ATTORNEYS Patented Mar. 1, 1927.

1,619,114

UNITED STATES PATENT OFFICE.

EDWARD ALFRED GRAHAM, OF BROCKLEY, LONDON, ENGLAND; MARIA GRAHAM AND ALFRED GRAHAM EXECUTORS OF SAID EDWARD ALFRED GRAHAM, DECEASED.

TELEPHONIC RECEIVER.

Application filed July 21, 1925, Serial No. 45,113, and in Great Britain August 6, 1924.

In the specification of my application for Letters Patent Serial No. 717,063 there are described telephonic receivers wherein the diaphragm thereof is retained, held, suspended or maintained in position in such a manner as to obviate the imposition of any mechanical stress or strain thereon other than such as may be exercised by the influencing electro-magnetic device or component used therewith.

The present invention consists of improvements in or modifications of the invention described and claimed in the said former specification as will now be described with reference to the accompanying illustrative drawings wherein Figs. 1 to 4 inclusive are perspective views, partly in section, showing various constructions of telephonic receivers constructed according to the present invention. Fig. 5 shows in section a modification of the bearing ring in relation to the diaphragm with which it co-operates.

Figure 1:
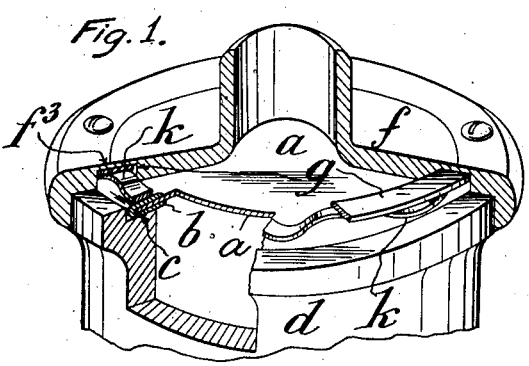

In the arrangement shown in Fig. 1, the peripheral portion of the diaphragm $a$ is embraced by a ring $b$ of rubber or other like soft non-sonorous material (hereinafter called for brevity rubber) channel shape in cross section or it may be placed between two rings or washers of such material, and is lightly held in place within a recess $c$ in the telephonic receiver casing $d$ by a bearing ring or washer $k$ which is in form of a ring of undulating or wavy shape. This ring is formed of springy material, as for instance of thin sheet steel, phosphor-bronze, German silver or the like, or be of non-metallic material, as for instance, celluloid, vulcanite or the like and is arranged between the ring $b$ and the end cover $f$, or wall, of the receiver casing $d$. Such a spring ring may be formed from a plain circular blank that is afterwards bent to the appropriate wavy shape. A ring $g$ of rubber, felt, cork or equivalent non-sonorous material may, as shown, be arranged between the spring bearing ring or washer $k$ and the cover $f$ of the casing $d$ of the receiver and be housed in an annular groove $f^3$ in the cover.

Figure 2:
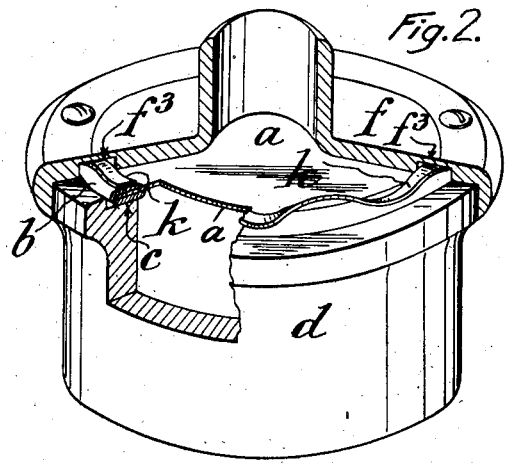

The interposed ring $g$ (Fig. 1), of rubber, felt or the like may, as shown in Fig. 2, be dispensed with, the undulating ring $k$ bearing upon the ring $b$ and being partly housed in the annular groove or recess $f^3$ in the cover $f$, or end wall of the casing $d$.

Where a bearing ring is arranged to act directly against the uncovered peripheral portion of the diaphragm, as in Fig. 4, it may be provided with a number of small pads of felt, chamois leather or like soft material, arranged to bear lightly and directly against the diaphragm.

Fig. 5 shows an arrangement wherein the bearing ring $k$ is provided with a number of small pads $k^3$ of felt, chamois leather or like soft material, arranged to bear lightly and directly against the uncovered peripheral portion of the diaphragm.

Each of the arrangements hereinbefore and also each of those described in my said former specification may be modified by dispending with the recess $f^3$ in the end cover $f$, or wall of the receiver casing, and arranging the bearing ring $k$ (Fig. 2), or the ring $g$ (Fig. 1) of felt or the like arranged between the bearing ring and end cover or wall to bear against an unrecessed flat surface on the inner side of the said end cover or wall of the casing. Fig. 3 shows one such arrangement wherein a bearing ring $k$ of undulating shape, such as shown in Figs. 1 and 2, is arranged to bear directly against the flat inner surface $f^1$ of the cover $f$.

Whilst a recess $c$ has been specifically referred to, in the present specification and also in the said former specification as provided in the casing $d$ to receive the diaphragm $a$, it will be understood that such recess may be dispensed with and the diaphragm be arranged to rest upon the flange or end of the casing $d$ in which circumstance the cover $f$ would be of greater substance and be recessed to a greater extent.

Fig. 4 shows one such arrangement wherein the diaphragm $a$ bears, through its ring $b$ of rubber, on the flat unrecessed end surface $d^1$ of the casing $d$ and the inner side of the cover $f$ is recessed to accommodate the bearing ring $k$, the resulting flange $f^*$ of the cover bearing on the end surface $d^1$ outside the diaphragm.

Diaphragms mounted in any of the ways described, may directly be influenced by an electro-magnetic system, such as is commonly used in telephonic receivers, the diaphragm being of magnetic material. In some cases however the diaphragm may be of aluminium, mica or other non-magnetic material that is advantageous from an acoustic point of view, and be actuated by a lever, reed or other device connected thereto and influenced by the electro-magnetic system of the receiver. Or a coil or other device forming part of or adapted to form part of an electro-magnetic system may be secured to the diaphragm for influencing the latter as the result of the passage of telephonic current through the operative winding of such electro-magnetic system.

By the term "outer abutment" used in the appended claims, is meant, the end cover $f$, or an end wall of the receiver casing $a$, or equivalent device carried by the casing, and serving in each case as a rigid or substantially rigid outer support for the spring bearing ring of undulating or wavy shape used to press the peripheral portion of the diaphragm $a$ against the stationary ring $b$, or annular seat $c$ carried by the casing at the inner side of the diaphragm and serving as an inner abutment for the peripheral portion of the diaphragm. It is to be understood that the solid ring $b$ of rubber, felt cloth or like sound deadening or damping material, does not act as a spring seat or support, but as a substantially rigid seat or support, for the diaphragm $d$ like the hard seat $c$, but its use is preferred, as it forms a sound deadening means to prevent chatter of the diaphragm that might occur if the diaphragm be arranged to bear directly against the hard seat $c$.

What I claim is:—

1. A telephonic receiver comprising, in combination, a casing having at one end portion thereof an inner seat and an outer abutment, an electro-magnetic diaphragm influencing system arranged within said casing, a diaphragm extending over said diaphragm influencing system and seat, soft sound damping material arranged between said seat and the peripheral portion of said diaphragm, and a bearing ring of undulating or wavy shape, formed of springy material arranged between said peripheral portion of said diaphragm and said outer abutment and adapted to hold the peripheral portion of said diaphragm against said damping material and seat.

2. A telephonic receiver comprising, in combination, a casing having at one end portion thereof an inner annular seat and an outer abutment, an electro-magnetic diaphragm influencing system arranged within said casing, a diaphragm extending over said diaphragm influencing system and seat, a ring of soft sound dampening material arranged between said seat and the peripheral portion of said diaphragm and a bearing ring of undulating or wavy shape, formed of springy material arranged between said peripheral portion of said diaphragm and said outer abutment.

3. A telephonic receiver comprising, in combination, a casing having at one end portion thereof, an inner seat and an outer abutment, an electro-magnetic diaphragm influencing system, a diaphragm extending over said diaphragm influencing system and said seat, soft sound damping material arranged between said seat and diaphragm, a bearing ring of undulating or wavy shape, formed of springy material, arranged between said peripheral portion of said diaphragm and said outer abutment and soft sound damping material arranged between said bearing ring and peripheral portion of said diaphragm.

4. A telephonic receiver comprising, in combination, a casing having at one end portion thereof an inner seat and an outer abutment, an electro-magnetic diaphragm influencing system, a diaphragm extending over said diaphragm influencing system and said seat, soft sound damping material arranged between said seat and diaphragm, a bearing ring of undulating or wavy shape, formed of springy material, arranged between said peripheral portion of said diaphragm and said outer abutment and a ring of soft sound damping material arranged between said bearing ring and peripheral portion of said diaphragm.

5. A telephonic receiver comprising, in combination, a casing having at one end portion thereof, an inner seat and an outer abutment, an electro-magnetic diaphragm influencing system, a diaphragm extending over said diaphragm influencing system and said seat, a ring of soft sound damping material arranged between said seat and diaphragm, a bearing ring of undulating or wavy shape, formed of springy material arranged between the peripheral portion of said diaphragm and said outer abutment, and a ring of soft sound damping material arranged between said diaphragm and bearing ring.

6. A telephonic receiver comprising, in combination, a casing having at one end portion thereof an inner seat and an outer abutment, an electro-magnetic diaphragm influencing system arranged within said casing, a diaphragm extending over said diaphragm influencing system and seat, soft sound damping material arranged between said seat and the peripheral portion of said diaphragm, a bearing ring of undulating or wavy shape, formed of springy material, arranged between the peripheral portion of said diaphragm and said outer abutment and adapted to hold the peripheral portion of said diaphragm against said soft sound damping material and soft sound damping material between said bearing ring and outer abutment.

Signed at London, England, this tenth day of July, 1925.

EDWARD ALFRED GRAHAM.